Patented Mar. 2, 1954

2,671,091

UNITED STATES PATENT OFFICE 2,671,091

4-PREGNENE-3,6,11,20-TETRAONE AND PROCESS

Robert Bruce Ogilvie and Arthur R. Hanze, Kalamazoo, Mich., assignors to The Upjohn Company, Kalamazoo, Mich., a corporation of Michigan No Drawing. Application March 25, 1952, Serial No. 278,488

4 Claims. (Cl. 260—397.3)

This invention relates to a new compound, 4-pregnene-3,6,11,20-tetraone. An object of this invention is to obtain a compound having pharmacological activity. Another object is to obtain a compound having utility in the synthesis of cortisone and other 11-oxygenated steroids.

The 4-pregnene-3,6,11,20-tetraone of this invention is made by controlled oxidation of 6,11-dihydroxyprogesterone with about four equivalents or more than two equivalents of an oxidizing agent per mole of 6,11-dihydroxyprogesterone. Suitably, potassium permanganate, N-bromacetamide in tertiary butanol, or chromic acid may be used as oxidant.

The preparation of 4-pregnene-3,6,11,20-tetraone may be graphically illustrated as follows:

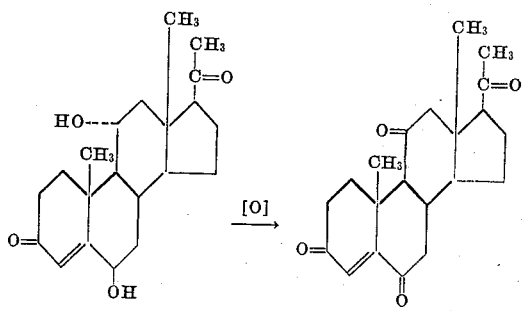

The following preparation and examples are illustrative of the processes and product of the present invention and are not to be construed as limiting.

PREPARATION.—6,11α-DIHYDROXYPROGESTERONE

A medium was prepared from five milliliters of corn steep liquor, twenty grams of Edamine commercial lactalbumin digest and fifty milligrams of Cerelose commercial dextrose per liter of tap water and adjusted to a pH of between about 5.5 and 5.9. To four liters of this medium containing a 32 to 48 hour growth of *Rhizopus arrhizus*, ATCC 11145, at room temperature with aeration was added one gram of progesterone in fifty milliliters of acetone. The culture was then incubated at room temperature for 48 hours. At the end of this time, the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of a two percent aqueous sodium bicarbonate solution and three 500-milliliter portions of distilled water. The methylene chloride extract was evaporated to dryness in vacuum and the solid residue taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly to room temperature. Seventy-five milligrams of crystals, melting at 246 to 249 degrees centigrade, separated from the mother liquor.

*Example.—4-Pregnene-3,6,11,20-tetraone*

To 140 grams of 6,11-dihydroxyprogesterone, as prepared above, was added 612 milligrams of chromic oxide, $CrO_3$, in 200 milliliters of glacial acetic acid, to give a ratio of 4.54 equivalents of chromic acid per mol of steroid. After remaining two hours at room temperature, the reaction mixture was diluted with water, and then extracted with methylene chloride. The methylene chloride extract was washed with sodium bicarbonate solution, dried over anhydrous sodium sulfate, filtered and evaporated to dryness under vacuum. The residue was dissolved in 140 milliliters of benzene and chromatographed over a column of sixty grams of alumina (hydrochloric acid washed, dried at 120 degrees centigrade) using 140 milliliter portions of developing solvents as indicated in the table.

Fraction 17 upon recrystallization from ethyl acetate by the addition of Skellysolve B petroleum ether yielded yellow crystals of 4-pregnene-3,6,11,20-tetraone, melting point 151 to 153 degrees centigrade, ultraviolet extinction coefficient $k_{248}$ of 29.52, E of 10,700. Infrared spectroscopy confirmed this structure.

*Analysis.*—Calculated for $C_{21}H_{26}O_4$: C, 73.7; H, 7.64. Found: C, 73.89; H, 7.64.

4-Pregnene-3,6,11,20-tetraone demonstrates inhibitory properties in estrogenic, glucocorticoid, folliculoid, luteoid, testoid, hypertensive, salt retention as exhibited by desoxycorticosterone, spermatogenic and progesterone activities. Reduction with palladium, to saturate the double bond, preparation of the selective thioketal according to Hauptman, and desulfurization with Rhaney nickel produces pregnane-3,11,20-trione.

TABLE

*Chromatography of the tetraketone from 6,11-dihydroxyprogesterone*

| Fraction | Solvent | Eluate Solids, Milligrams |
|---|---|---|
| 1 | benzene | 8 |
| 2 | do | 2 |
| 3 | benzene-ether, 19:1 | 4 |
| 4 | do | 3 |
| 5 | benzene-ether, 9:1 | 2 |
| 6 | do | 3 |
| 7 | benzene-ether, 1:1 | 5 |
| 8 | do | 6 |
| 9 | ether | 9 |
| 10 | do | 9 |
| 11 | ether-chloroform, 19:1 | 5 |
| 12 | do | 3 |
| 13 | ether-chloroform, 9:1 | 4 |
| 14 | do | 2 |
| 15 | ether-chloroform, 1:1 | 4 |
| 16 | do | 11 |
| 17 | chloroform-acetone, 19:1 | 483 |
| 18 | do | 321 |
| 19 | chloroform-acetone, 9:1 | 132 |
| 20 | do | 27 |
| 21 | chloroform-acetone, 1:1 | 19 |
| 22 | do | 16 |
| 23 | benzene-methanol, 99:1 | 10 |
| 24 | do | |
| 25 | benzene-methanol, 19:1 | 42 |
| 26 | do | 11 |
| 27 | benzene-methanol, 9:1 | 8 |
| 28 | do | |
| 29 | benzene-methanol, 4:1 | |
| 30 | do | |
| 31 | do | |

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. 4-Pregnene-3,6,11,20-tetraone.

2. A process for the preparation of 4-pregnene-3,6,11,20-tetraone comprising reacting 6,11-dihydroxyprogesterone with about four equivalents of oxidizing agent per mole of 6,11-dihydroxyprogesterone.

3. A process for the preparation of 4-pregnene-3,6,11,20-tetraone comprising reacting 6,11-dihydroxyprogesterone with more than two equivalents of an oxidizing agent per mole of 6,11-dihydroxyprogesterone.

4. A process for the preparation of 4-pregnene-3,6,11,20-tetraone comprising reacting 6,11-dihydroxyprogesterone with about four equivalents of chromic acid per mole of 6,11-dihydroxyprogesterone.

ROBERT BRUCE OGILVIE.
ARTHUR R. HANZE.

References Cited in the file of this patent

UNITED STATES PATENTS

| Number | Name | Date |
|---|---|---|
| 2,403,683 | Reichstein | July 9, 1946 |